United States Patent [19]

Margolis et al.

[11] 4,031,251

[45] June 21, 1977

[54] DECAFFEINATION OF VEGETABLE MATERIAL

[75] Inventors: Geoffrey Margolis, Marysville; Dean Frederick Rushmore, Delaware; Richard Tien-Szu Liu, Worthington, all of Ohio

[73] Assignee: Societe d'Assistance Technique pour Produits Nestle S.A., Lausanne, Switzerland

[22] Filed: Jan. 8, 1975

[21] Appl. No.: 539,535

[52] U.S. Cl. .............................. 426/387; 210/23 H; 210/32; 210/40; 426/422; 426/427
[51] Int. Cl.² ........................................ A23F 1/10
[58] Field of Search .......... 426/427, 271, 428, 422, 426/386, 387; 210/24, 40, 23 U, 23 H, 22, 32

[56] References Cited

UNITED STATES PATENTS

| 1,908,407 | 5/1933 | Coupeau et al. | 426/387 |
|---|---|---|---|
| 2,391,981 | 1/1946 | Kremers | 426/428 X |
| 3,108,876 | 10/1963 | Turken et al. | 426/427 |
| 3,228,877 | 1/1966 | Mahon | 210/22 |
| 3,361,571 | 1/1968 | Nutting et al. | 426/387 |
| 3,367,787 | 2/1968 | Thijssen et al. | 210/22 X |
| 3,448,042 | 6/1969 | Mattia et al. | 210/32 X |
| 3,531,463 | 9/1970 | Gustafson | 210/30 X |
| 3,625,886 | 12/1971 | Mattia | 210/32 |
| 3,720,626 | 3/1973 | Benzaria et al. | 210/30 X |

FOREIGN PATENTS OR APPLICATIONS

| 742,472 | 2/1970 | Belgium | 426/432 |

OTHER PUBLICATIONS

"Adsorption of Organic Species by High Surface Area Styrene–Divinylbenzene Copolymers" by Gustafson et al., I EC Product Research and Development, vol. 7, No. 2, June 1968, pp. 107–115.
Ion Exchangers in the Isolation of Caffeine from Mate Leaf," Extract from a Dissertation Submitted to School of Chemistry and Pharmacy of La Plata, approved 11/49.
Summary Bulletin: Amberlite Polymeric Adsorbents, published by the Rohm and Haas Co., Ind. Mall West, Phila, Penn. 7/71.
Amberlite XAD–2 published by the Rohm and Haas Co., Phila, Pa. 19105, 7/71.
Preliminary Technical Notes–Amberlite XAD–4, published by the Rohm and Haas Co., Phila., Pa. 19105, 7/71.
Preliminary Technical Notes–Amberlite XAD–7, published by the Rohm and Haas Co., Phila., Pa. 19105, 5/72.
Decolorizaton of Kraft Pulp Bleaching Effluents Using Amberlite XAD–8 Polymeric Adsorbent, pub. by Rohm and Haas Co., Phila., Pa., 4/72.
Abstract, "Thin Layer Chromatography of Phenolic Acids in Plant Extracts," 75:33397m, 1971.
Abstract "Plant Phenols" 55:14750e, 1960.

*Primary Examiner*—Frank W. Lutter
*Assistant Examiner*—N. Greenblum
*Attorney, Agent, or Firm*—Watson, Leavenworth, Kelton & Taggart

[57] ABSTRACT

A process is disclosed wherein the decaffeination of aqueous extracts of vegetable material with non-ionic, hydrophobic resin may be performed in a continuous manner. In accordance therewith, extract is contacted with resin to effect decaffeination, exhausted resin containing adherent caffeine and non-caffeine water solubles is bleached with water to remove the caffeine, the caffeine-free resin is then washed with a solution comprising water and an organic solvent to elute non-caffeine water solubles and then the resin is rinsed with water to permit its reuse in the further decaffeination of vegetable material extracts.

16 Claims, No Drawings

DECAFFEINATION OF VEGETABLE MATERIAL

BACKGROUND OF THE INVENTION

The prior art has long recognized the demand for decaffeinated beverages such as coffee and tea. Primarily, however, the previously utilized decaffeination techniques have involved the use of organic solvents such as trichloroethylene or chloroform to treat either the vegetable material itself or an aqueous extract thereof, with subsequent separation of caffeine-laden organic solvent, so as to allow further processing of the beverage.

These solvent-based decaffeination techniques have several obvious disadvantages. Organic solvents, and their post-treatment to permit reuse, constitute a considerable operational expense. The solvents are often toxic and therefore require careful separation from the eventual beverage product. The solvents are often highly volatile thus requiring careful plant maintenance as well as ample ventilation in order to ensure the safety of workers. Additionally, various organic solvents indiscriminately solubilize many beverage constituents. Thus, their resultant solutions may require further treatment to isolate and permit re-incorporation of desirable solubles into the beverage product.

In view of these and many other problems which have been encountered in using organic solvents for decaffeination, it is understandable that a multitude of complex techniques have been evolved in order to minimize their drawbacks. In addition, some attempts have been made to avoid their difficulties entirely by dispensing with caffeine solvents while researching totally different process means.

U.S. Pat. No. 2,151,582 of Block exemplifies such attempts to avoid the use of organic solvents. This patent describes various uses of carbon adsorbents to decaffeinate coffee extract. Because of the high strength of the carbon affinities for coffee constituents, however, subsequent regeneration of the carbons is impractical. Accordingly, these techniques proved too expensive for commercialization and were abandoned.

In accordance with the process of U.S. Pat. No. 3,108,876 of Turken et al, ion exchange resins may be employed to decaffeinate a coffee concentrate. As the patent teaches, however, the ion exchange resins also remove important noncaffeine constituents and drastically lower the pH of the concentrate. Accordingly, treatment of the decaffeinated concentrate with artificial neutralizing agents is taught to be necessary to raise its pH to a normal value and refurbish its mineral content. Such agents do not derive from the coffee itself; however, and the resultant adulterated product has not proven successful.

The foregoing patents exemplify the state of the art with respect to non-solvent decaffeination of vegetable materials such as tea and coffee. Thus, although considerable effort has been expended on such alternative processes, commercial scale decaffeination remains dependent on caffeine solvent based extractions.

INTRODUCTION TO THE DISCLOSURE

This invention relates to the decaffeination of aqueous extracts of vegetable material with polymer resin and has for an object, an improved process having an efficiency and operational characteristics desirable for commercial utilization. Moreover, this process may be accomplished in a manner which permits substantially selective removal of caffeine and which does not include adulteration of, or adverse flavour effect on, the resultant product.

More particularly, an object of the present invention is a means through which non-ionic hydrophobic polymeric resin may be utilized in the decaffeination of vegetable material extract, regenerated through removal of adherent caffeine and other noncaffeine vegetable material solubles and then reused for the further decaffeination of vegetable material extract.

A further object of the present invention is to provide a process wherein solubles retained by a non-ionic, hydrophobic polymeric resin incident to decaffeination may be separated during regeneration so as to permit simplified recovery and/or return of the non-caffeine solubles to decaffeinated vegetable extract, thereby to prevent loss of valuable vegetable material solubles.

DESCRIPTION OF THE INVENTION

In accordance with the present invention, non-ionic, hydrophobic resin is contacted with aqueous extract of vegetable material to adsorb caffeine. After some time of contact the resin will exhibit sufficient decline in activity as to require regeneration. It is then separated from the extract, and leached with water to solubilize and remove adherent caffeine. The caffeine-free resin is then eluted with a wash solution comprising water and an organic solvent to remove non-caffeine solubles therefrom. Finally, the wash solution is removed from the resin by rinsing with water to remove retained organic solvent and to ensure that the resin is in the hydrated form in which it exhibits greater activity of decaffeination. Thereafter, the resin may be reused by once again bringing it in contact with caffeine-containing extract of vegetable material.

In the circumstances encountered incident to the present invention, the present resins are highly specific in adsorbtivity and do not remove substantial quantities of most naturally occurring vegetable components. As noted, however, caffeine is not the only soluble compound adsorbed and removed by the present resins. Indeed, an unexpected and beneficial advantage of the present invention lies in the discovery that, coincident with caffeine removal, other components may simultaneously be adsorbed. These components, which are later freed from the present resins, may then be returned to the beverage, if desired. Selectivity may be practiced in their return, however, thus permitting a unique flexibility in adapting the flavour of the product beverage to various desired tastes.

Chlorogenic acid (or the corresponding chlorogenate) is the most significant of these additional components. This constituent, which is generally present in, for example, coffee in an amount up to about 12% by weight of solids, constitutes its largest single non-volatile acid component. In accordance with the present process, the total concentration of chlorogenic acid or chlorogenate in coffee extract can be reduced by an amount up to about 80%; usually from about 25% to 50%, through simultaneous adsorption with the caffeine. A similar reduction may be accomplished in other vegetable material extracts such as tea. This reduction in total amount is of major importance inasmuch as it constitutes a removal of naturally occurring beverage acid which has heretofore been feasible only through specialized treatment. Thus the process of this invention can provide a beverage of substantially decreased acidity and yield a smoothness of taste which has long been sought in the art.

Polymeric resins used in the process of the present invention-in contrast with the ion exchange resins of the prior art-are essentially devoid of ionic or ionizable substituents and therefore exhibit only limited polarities. This characteristic is important, inasmuch as such hydrophobic resins-i.e., neutrally charged and non-polar-provide an attractive site for hydrophobic, or hydrophobic portions of, molecules such as caffeine and chlorogenic acid to be adsorbed. Particularly desirable intrapolymeric adsorption sites include those provided by functional groups and/or extended pi-electron configurations-for example phenyl and similar benzene-type radicals-which are of low polarity. Accordingly, the present resins should exhibit a dipole moment of less than about 2.0, preferably less than about 0.5, debye.

It has additionally been discovered that the physical characteristics of the present resins are important. These resins should be solid and remain insoluble under the conditions of decaffeination and subsequent regeneration. It is also desirable that they be hard, so that no deformation-with resultant change in surface area, porosity, etc.-could occur and alter their adsorbtive properties.

Thus, the resins are ordinarily of a size within the range of from about 20 to about 60 mesh, in order to ensure intimate contact between the dissolved vegetable material constituents and the resin itself. Additionally, the resins should exhibit sufficient surface area so as to enable efficient decaffeination. Accordingly, the resins desirably provide a surface area within the range of from about 100 to about 1,000 and, preferably, between 300 and 800 square meters per gram.

Further, the resins used in the process of this invention should preferably exhibit a total porosity volume of from about 40% to 60%. Moreover, such porosity is desirably distributed largely in pores having an average diameter of between about 50 and 300 angstroms; preferably between about 90 and 300 angstroms, as some off-flavour may result when using resins of lower pore diameters.

Finally, the resins are preferably in wetted or hydrated condition incident to utilization in accordance with the present invention. For more polar resins-i.e. those approaching 2.0 debye-this condition is easily obtained merely through contact of the resin with a water source which can include the aqueous extract of vegetable material to be decaffeinated. Less polar resins-i.e. those of about 0.5 debye or less-are not, however, so easily hydrated. Accordingly, these resins may first be soaked in a water-soluble solvent such as acetone, ethanol or methanol, after which, replacement with water conditions the resins for best results during use.

Because the resins are desirably maintained in hydrated form throughout the decaffeination and regeneration of the present invention, they should not be exposed unnecessarily to air or to solvents which will remove their water of hydration. Should the resins become dry, however, they can again be wetted for use, for example as has already been described above.

Particular resins useful within the scope of the present invention include the acrylic ester resins denominated XAD-7 and XAD-8 and sold under the trademark "Amberlite" by the Rohm and Haas Company of Philadelphia, Pennsylvania. Also useful and preferred are the polystyrene-divinyl benzene "Amberlite" resins, XAD-2 and XAD-4, commercially available from the same source.

Each of the foregoing resins is more completely identified and described in a series of technical bulletins published by the Rohm and Haas Company. Accordingly such bulletins-expressly including:

"Summary Bulletin Amberlite Polymeric Adsorbents" identified by the designation, IE-172, and bearing the date, July, 1971. This brochure provides descriptions of each of the present resins XAD-2, XAD-4, XAD-7, and XAD-8.

"Amberlite XAD-2" identified by the designation IE-89-65 and bearing the notation "Revised July, 1971."

"Preliminary Technical Notes Amberlite XAD-4" identified by the designation, IE-69-159, and bearing the notation "Revised July, 1971."

"Preliminary Technical Notes Amberlite XAD-7" identified by the designation, IE-204, and bearing the date, May, 1972.

"Decolorization of Kraft Pulp Bleaching Effluents Using Amberlite XAD-8 Polymeric Adsorbent" identified by the designation, IE-75, and bearing the date, April, 1972- are incorporated herein by reference further to describe the resins useful in the present invention.

In accordance with the process of the present invention, an extract (usually aqueous) of a vegetable material which contains caffeine is first prepared in conventional manner. For example, a coffee extract may contain from about 10% to 50% by weight of solubles and preferably contains from about 15 to 25% coffee solubles. The extract may then be subjected to a step in which the volatiles are removed. For example, steam may be employed to strip the coffee aroma volatiles from the extract in a countercurrent operation which permits the separation of devolatilized, dearomatized extract from retained coffee aroma volatiles, so as to permit return of the volatiles to the coffee extract at a subsequent processing stage. Other extracts, such as of tea, are preferably also stripped and of similar solubles concentrations.

The removal of volatiles from the aqueous extract is not mandatory, however. It is possible, for example, to steam distill the coffee aroma volatiles from the original roast and ground coffee prior to aqueous extraction. Again, the steam distillate is preferably returned to the decaffeinated extract in a later processing stage.

It is even feasible to transpose the usual initial steps and remove volatiles after decaffeination. Thus, for example, where green coffee beans are decaffeinated with water as taught in U.S. Pat. No. 2,309,092 of Berry et al, the resultant aqueous solution may be treated with the resins to adsorb caffeine. Thereafter, the beans are roasted and extracted to produce an aqueous caffeine-free solution which may be devolatilized for flavour protection during at least some of the subsequent steps utilized in the further processing of a solid, "instant" coffee product.

Indeed, many methods for the recovery of coffee aroma volatiles are known and practiced in the art and any may be employed herein. It is not necessary that the volatiles be removed; removal at the earliest convenient stage is, however, preferred inasmuch as loss of such volatiles may otherwise occur during decaffeination and/or subsequent treatment, thus leading to an eventual beverage having considerably reduced flavour and aroma.

The decaffeination, preferably of an aqueous volatiles-free vegetable material extract, may take place simply, through exposure of the extract to the resin. In most cases, this contacting should occur in suitable columns, tanks or other beds holding the particularized resins.

Numerous apparatus systems and processing conditions for contacting resin and aqueous extract will be readily apparent to those of ordinary skill in the art. In a preferred embodiment, many beds of the resin are present in the decaffeination system. Accordingly, when the beverage extract is passed to any one such bed or series of beds, other used beds can be reactivated or regenerated through the removal of adsorbed and entrained coffee constituents therefrom. In this manner, a continuous process is rendered feasible.

The flow rate of extract and volume of resin should be adjusted so as to permit intimate contact for at least 5 minutes, preferably from about 20 to about 60 minutes, therebetween. Extended periods are not required for small quantity of extract and for fresh resin. However, a normal commercial procedure would generally require several, for example, at least about 5 to 15, separate resin beds, for efficient decaffeination.

The availability of numerous beds in a process within the scope of the present invention permits more efficient utilization of the resins. Thus, by ordering several of the beds in counter-current fashion so that the extract contacts consecutively less-exhausted resins, maximum caffeine removal is possible. As the first bed in the series is completely exhausted, it can be bypassed and regeneration thereof begun. Moreover, a regenerated bed can simultaneously be connected as the last bed in the flow scheme, thereby insuring relatively uniform, efficient and complete decaffeination.

In such a counter-current system, however, much of the resin is in a partially exhausted state and is of lower activity. Consequently, longer total contacting times may be desired for maximum decaffeination. Thus, up to about 5 hours of resin-extract contact is preferred. It is also possible to exert control over the total amounts, and ratios between the amounts, of constituents initially removed from the extract by the resins. These constituents consist largely of caffeine and chlorogenic acid, and the affinities of the different resins and resins in different degrees of exhaustion for such constituents vary. Thus, selection of amounts of resin and of particular resin compositions may be practiced in order to achieve desired concentrations of these constituents in the extract after treatment.

Where different resins or resins in different degrees of exhaustion are employed, it is advantageous to utilize separate containers, or beds, for each. These containers, or beds, may then be connected in parallel, or preferably series, flow for extract contact. Where mixtures of different resins are utilized for control of product extract composition, the separate resins may be located in individual containers or may be admixed within each container to form composite beds.

In the subsequent production of dried beverage extracts from decaffeinated extract, it is desirable that the extract have a total solids concentration within the range of from about 30 to about 60%, preferably from about 40% to about 50% by weight. Accordingly, it is often necessary to concentrate the beverage from its original extraction and decaffeinated concentration. This concentration may be performed by any means well-known in the art. Thus, for example, freeze concentration, vacuum evaporation or any of the other conventional techniques may be employed. It may also be performed at an earlier processing stage-e.g., preparatory to decaffeination. Concentration, however, increases the viscosity of extracts, so it is preferred that it be performed after all but the drying step.

The concentrate may be dried by any convenient method. Thus, for spray-drying, for example, may be employed, however, it is preferred that the concentrate be frozen and then freeze-dried. This latter technique yields a superior product as it avoids the detrimental effects which higher temperature may have on the flavor of the beverage solubles.

As mentioned previously, it is additionally desirable to re-incorporate the originally removed aroma and flavor volatiles into the dried product. Accordingly, a solution of such volatiles may be added to the dried product, or, alternatively, the volatiles may be returned to a process stage intermediate decaffeination and drying, preferably to the concentrated extract.

As indicated above, the present resins are permitted to remain in contact with extract until their decaffeination activity has been substantially reduced through saturation with adsorbed solubles. Thereafter, the exhausted resin is separated for regenerative treatment. At such time new or already regenerated resin is also substituted for the exhausted resin where, as is preferred, a continuously operational decaffeination process exists.

After the resin has been exhausted, and prior to its regeneration, one optional treatment has proven particularly desirable. Therein, the resin is flushed with water to displace the extract retained in the bed. This flush recovers the unadsorbed solubles in this fraction of extract. In some cases too, the resin bed acts like a filter and may become partially clogged with undissolved particles of vegetable materials. By flushing the resin-preferably in a direction reverse to the flow of extract during decaffeination-these particles are easily removed.

This flush, or preferably back-flush, is ordinarily performed utilizing water at a temperature of from about 0° to 30° C, so as to minimize the coincident removal of adsorbed solubles. The water containing solubles and/or solids may then be added to the initial or decaffeinated extract, utilized to extract vegetable material or otherwise recovered, to avoid losses.

The first step in the present regeneration technique comprises leaching the caffeine from the separated, exhausted resin. This step is performed by contacting the resin with water to solubilize the caffeine, and then removing the aqueous solution of caffeine. Ordinarily, sufficient water to remove all or essentially all of the caffeine adsorbed on the resin should be utilized. In this manner, subsequent treatment of the resin to remove non-caffeine solubles permits recovery of a caffeine-free isolate.

In some cases, however, it is not necessary to remove all the caffeine in this water leach operation. Local preference may call for products which are only partially decaffeinated. Thus, where the solubles removed from the resin by subsequent steps are to be recycled to the decaffeinated extract, those solubles may include some caffeine without diminishing the advantages otherwise attendant to the present invention.

In a preferred embodiment of this leaching step, the water is pre-heated in order to increase its capacity for solution of caffeine. Certain of the non-caffeine vegetable solubles also retained by the resin are heat sensitive, however, and because it is desirable to effect their return to the decaffeinated extract, the water should not be at a temperature so high as to cause degradation of their flavor. Accordingly, it has been determined that, for optimum results, the water should have a temperature of from about 65° to 85° C.

Another preferred embodiment of leaching involves reducing the amount of water utilized to solubilize the caffeine. More particularly, it has been discovered that caffeine can be removed from water which has already contacted the resin, thus permitting recycle of water further to wash the resin. Further, such recycling technique permits an essentially closed circuit recirculation and thereby minimizes the expense and difficulty attendant to disposal of large amounts of water contaminated with caffeine. Thus, in a preferred embodiment of the present invention, the aqueous caffeine-containing solution is subjected to a separation step whereby essentially all the caffeine is removed therefrom and the wash solution is then recirculated to exhausted resin.

This separation of caffeine from its aqueous solution is most conveniently effected with a reverse osmosis membrane system. Water permeable membranes, such as cellulose acetate, preferably of a sensitivity so as to exhibit a sodium chloride rejection factor of from about 80 to 98%, are known in the art, and where utilized in accordance with the present process for the separation of caffeine, these membrane systems effect essentially complete removal of caffeine. Accordingly, they represent a particularly preferred embodiment of the present invention inasmuch as they serve the function of isolating a caffeine by-product and additionally permit substantial reduction in the amounts of wash water necessary for removal of caffeine from the exhausted resin.

The solubles thus leached from the resin are not, however, exclusively caffeine. Some other solubles-principally chlorogenic acid-are also removed in this step even though it is substantially selective toward caffeine removal. In order to reduce the loss of non-caffeine solubles during the present processing sequence, it may therefore be beneficial to recover these solubles.

Thus isolation of the various leached constituents may be desired. Accordingly, for example, the solubles can be removed from the wash solution and be subjected to a conventional separatory technique, representatively electrodialysis, solvent extraction or fractional sublimation. Similarly, an anion exchange resin can be utilized to exchange, for example, the chlorogenic acid, which constituent is then separately obtained through reacidification of the resin. In this manner, the present invention permits recovery of isolates of both caffeine and chlorogenic acid, both of which isolates are useful commercially.

It is usually preferred, however, that at least a part of the non-caffeine leached solubles be returned to the coffee extract of the present process at a stage subsequent to decaffeination. This is particularly true for chlorogenic acid, which corresponds to a substantial portion-e.g. about 2 to 6% by weight in coffee-of total solubles, where substantial amounts of this material are leached with the caffeine. Being acidic, chlorogenic acid exerts a considerable effect on the flavor of the final beverage and can freely be utilized to adjust the beverage to regionally acceptable compositions. Accordingly, where smoothness of taste is desired, little or none would be re-incorporated into the beverage, and where a stronger beverage is preferred, most or all of these solubles are re-incorporated.

Once the wash step of the present invention has been performed, the resin is eluted with a wash solution which contains an organic solvent. This solution completes the removal of adsorbed solubles. The organic solvents are generally selected from among the alcohols, aldehydes and ketones in which the non-caffeine vegetable materials are highly soluble. Ordinarily, they exhibit molecular weights of less than about 100. Particularly preferred examples thereof are propanol and ethanol. This solution is also partly aqueous, due to dilution with resin retained leach water and, preferably, to additional water included for the purposes of minimizing solvent requirements and facilitating recovery of eluted solubles. This mixed aqueous-organic eluate, therefore, ordinarily contains at least about 20%, preferably about 40 to 80%, by weight of organic solvent.

As was the case in the leaching step described above---a high temperature wash is desirable in order to maximize the solubility coefficient for the vegetable solubles. Where these non-caffeine vegetable materals are solubilized, and thereafter maintained within a highly heated wash for any substantial period of time, however, significant flavor degradation may occur. Accordingly, this step of the present invention is preferably carried out at temperatures of from about 10° to 40° C. Because the solubles removed from the resin pursuant to this step are valuable, they are desirably returned to the decaffeinated extract or otherwise recovered.

Once utilized and laden with non-caffeine solubles, the wash is desirably treated to recover these solubles. Removal of these vegetable solubles from the wash solution may be accomplished through means generally known in the art. A particularly efficacious means of treatment has been discovered, however, whereby it is possible not only to separate the solubles, but additionally to form a reconstituted wash solution-essentially free of valuable vegetable material solubles-which may be reutilized to regenerate resin in a cyclic manner such as that which has been described above with respect to leaching caffeine from exhausted resin.

This preferred embodiment of the present invention comprises subjecting solution containing non-caffeine solubles to stripping with steam at a temperature sufficiently high to volatilize its organic solvent constituent. The gaseous steam and organic solvent phase is then separated from the remaining aqueous solution of vegetable material solubles, and such phase is then condensed to reconstitute a solution of both water and organic solvent. Moreover, once the organic solvent has been stripped from the original regenerative solution, the remaining aqueous solution consisting of vegetable material solubles may be returned to the decaffeinated extract to curtail losses. At the same time, the condensed phase of organic solvent and water may-if required-be diluted to its original water-solvent ratio and then recycled further to remove vegetable material solids from caffeine-free resin.

After all its original adherent vegetable material has been removed, the resin should be subjected to a third wash or rinse, in order to remove any adherent organic solvent. This is done to avoid contamination of vegetable material extract with which it will be contacted for subsequent decaffeination. This rinse, or displacement of organic solvent from the regenerated resin, is again accomplished through contact with water. Most simply, the contact is performed with water in the form of steam at a temperature sufficiently high to vaporize organic solvent remaining on the resin.

In a preferred embodiment, however, rinsing of the regenerated resin is performed with water at essentially ambient temperature of from about 10° to 40° C. This temperature is preferred in order to avoid heating the resin unduly, inasmuch as it might otherwise become necessary to cool the resin prior to its use for the decaffeination of additional vegetable material extracts in order to avoid flavor degradation in that extract.

Additionally, the water may be recycled in a closed system. This minimizes the quantities of water required in accordance with the present process and simplifies removal and preservation of organic solvent from the rinse. Thus, a liquid rinsing solution containing removed organic solvent may be subjected to stripping with steam so as again to allow the separation of organic solvent as a gaseous phase in the same manner set forth above. Moreover, once such gaseous phase of organic solvent and water has been condensed, it may be added to the previously described eluting solution so as to minimize the loss of organic solvent incident to the present process.

The above rising step ensures that the resin will be in the hydrated form in which is exhibits maximum activity of adsorption. Accordingly, the resin can be utilized for the further decaffeination of aqueous vegetable material extract.

Clearly, many variations in the steps and materials comprising the present process are possible without departing from the scope of this invention. These variations are conventional, however, and are therefore largely absent from the specification and the following examples which are only illustrative of the present invention. Unless otherwise noted herein, percentages are on a weight basis.

EXAMPLE NO. 1

A styrene-divinyl benzene resin sold by the Rohm & Haas Company under the trademark "AMBERLITE XAD-4" and having physical characteristics of:

| | | |
|---|---|---|
| Inherent dipole moment | = | 0.3 debye |
| Porosity volume | = | 50 to 55% (ml. pore/ml. (bead dry basis) |
| Surface area | = | 750 m²/g |
| True wet density | = | 1.02 g/cc |
| Average pore diameter | = | 50 Å |
| Skeletal density | = | 1.08 g/cc |
| Nominal mesh size | = | 20 to 50 | is utilized for the decaffeination of an aqueous coffee extract having a total solubles content of about 15%. The extract, at a temperature of 22° C, is passed slowly through a bed of resin. Upon reduction of the resin activity to 10% of its initial activity, the resin is removed from contact with the extract and back-flushed with a bed volume of water to remove entrained coffee solids. The resin is then in condition for regeneration.

70° C water is passed cyclically through the resin until essentially all the caffeine has been removed. As the caffeine-laden water exits from the resin volume, it is passed through a reverse osmosis system containing a cellulose acetate membrane having a sodium chloride rejection factor of 94%. This system removes the caffeine from the recirculating medium.

After all the caffeine has been removed from the resin, the resin-which still contains coffee solubles-is subjected to a second wash, using a solution of 40% water and 60% propanol. This solution is again passed repeatedly through the resin in a cyclic manner. As solution exits from the bed, and prior to recirculation thereto, however, the solution is stripped with steam at a temperature of 120° C to remove all of the propanol therefrom. The resultant aqueous solution containing solubles is then concentrated by vacuum dehydration and, upon reaching a solids concentration of 10%, is returned to the decaffeinated extract. The gaseous phase of steam and propanol is meanwhile condensed to reconstitute a solution of propanol and water and is recycled further to elute the resin.

After all the vegetable material has been removed from the resin, it is rinsed with a cyclic stream of water to remove retained propanol. Within the cycle, the solution containing propanol is again subjected to stripping with steam at 120° C. The condensate of this stripping operation is incorporated into the leaching solution of the prior step while the stripped water is recycled to the resin until all the propanol has been removed from the resin.

The resin is now devoid of adsorbed coffee solubles and has been returned to its more active form. Therefore, extract is passed slowly through it to effect decaffeination, thus beginning repetition of the foregoing portion of this Example.

EXAMPLE NO. 2

350 ml. of steam stripped aqueous coffee extract having a solids concentration of about 18% by weight is passed at a rate of 5 ml/min under ambient conditions through a gravity feed column containing 100 ml. of packed Amberlite XAD-2 resin initially submerged in water.

The XAD-2 (a styrene-divinyl benzene resin) has the following characteristics:

| | | |
|---|---|---|
| Inherent dipole moment | = | 0.3 debye |
| Porosity volume | = | 40 to 45% (ml. pore/ml. bead/dry basis) |
| Surface area | = | 330 m²/g |
| True wet density | = | 1.02 g/cc |
| Average pore diameter | = | 90 Å |
| Skeletal density | = | 1.07 g/cc |
| Nominal mesh size | = | 20 to 50 |

The initial liquid exiting from the column is discarded as it represents the water originally utilized to pre-moisten and preserve the resin. The extract thereafter collected from the column reflects a slow decline in the effectiveness of resin adsorbence. Thus the first 100 ml. of extract exhibits a 95% degree of decaffeination; the second 100 ml, 70%; and the third 100 ml, about 50%. The chlorogenic acid content of the product shows a similar decline in resin efficiency-the first 100 ml. exhibiting a 35% decrease from the extract content; the second, 20%, and the third, 6%.

Aromatics previously stripped are returned to the decaffeinated extract which is then diluted with hot water to normal beverage strength (about 1.1% solids). Taste testing of the beverage reveals a remarkably smooth, clean and less acidic flavor without detriment to aroma and volatile notes.

The column is then back-flushed with 200 ml. of cold water to displace the retained coffee solids and the remaining (approximately 50 ml.) portion of the original extract feed. The resin is now in condition for regeneration.

First, 65° C water is passed through the column of resin until the effluent is essentially caffeine-free. Then a 50% aqueous solution of propanol at 18° C is passed through the column until all the remaining resin adsorbed solubles have been removed. The resin is then rinsed with water at 30° C to effect its rehydration and permit its reuse. Subsequent analysis shows essentially complete regeneration of the resin to the activity exhibited prior to decaffeination.

EXAMPLE NO. 3

225 ml. of Amberlite XAD-7 resin, pre-conditioned by soaking in water, is placed in a beaker with 225 ml. of dearomatized aqueous coffee extract having a solids concentration of 18% by weight. The XAD-7 resin has the following physical characteristics:

| | | |
|---|---|---|
| Inherent dipole moment | = | 1.8 debye |
| Porosity volume | = | 50 to 55% (ml. pore/ml. bead/dry basis) |
| Surface area | = | 450 m²/g |
| True wet density | = | 1.05 g/cc |
| Average pore diameter | = | 80 Å |
| Skeletal density | = | 1.24 g/cc |
| Nominal mesh size | = | 20 to 50 |

The mixture is stirred slowly for one hour under ambient conditions and the coffee solution then decanted. Analysis of the separated solution shows 90% decaffeination and 76% chlorogenic acid removal.

After back-flushing and regenerating the resin in the manner set forth in Example No. 2, the resin exhibits essentially complete recovery of its initial activity.

EXAMPLE NO. 4

The decaffeination procedure of Example No. 3 is repeated substituting an equal amount of Amberlite XAD-8 resin. This resin has the following physical characteristics:

| | | |
|---|---|---|
| Inherent dipole moment | = | 1.8 debye |
| Porosity volume | = | 50 to 54% (ml. pore/ml. bead/dry basis) |
| Surface area (dry basis) | = | 140 m²/g |
| True wet density | = | 1.05 g/cc |
| Average pore diameter (dry basis) | = | 250 Å |
| Skeletal density (dry basis) | = | 1.23 g/cc |
| Nominal mesh size | = | 20 to 60 |

Analysis of the separated coffee solution shows 75% decaffeination and 60% chlorogenic acid removal.

After back-flushing and regenerating the resin in the manner set forth in Example No. 2, the resin exhibits essentially complete recovery of its initial activity.

100 ml. of hydrated Amberlite XAD-2 resin is placed in a beaker with 100 ml. of aqueous tea extract having a solids content of 15% by weight. The tea solution had been made by mixing appropriate amounts of water and commercial Nestea Instant Tea. The resultant mixture is stirred slowly in the beaker for thirty minutes under ambient conditions and the tea solution then decanted. Analysis of the separated solution shows greater than 90% decaffeination, and the resin exhibits essentially complete recovery of its initial activity after regeneration in the manner described in Example No. 2.

EXAMPLE NO. 6

A battery of eight extractors, each containing a 1000 lb. charge of green coffee beans, is subjected to decaffeination as more fully set forth in U.S. Pat. No. 2,309,092. In accordance with that patent, the beans of the separate extractors are in declining states of caffeine content-the beans first contacted by the extraction medium having the lowest caffeine contents-by virtue of previous extraction in the system. When the caffeine content in a charge has been reduced to about 2% of its original content, the extractor containing that charge is removed from the battery and another extractor-containing a charge of fresh green coffee beans-is added at the downstream end of the battery so as to retain eight extractors onstream at all times.

Extraction of the green beans is performed utilizing an aqueous medium heated to 200° F. This medium is circulated in closed cycle through the battery and removes caffeine and certain additional coffee solubles from the green beans. The flow rate of the medium is 3.3 gallons/minute.

Separate from the battery, but within the closed cycle of the extraction medium is a resin contacting zone for removal of caffeine from the extraction medium. This zone consists of multiple, parallel columns, each packed with pre-moistened Amberlite XAD-2 resin. The number of fresh resin, onstream columns is adjusted so as to result in substantially completed decaffeination of the extraction medium without retardation of its flow rate. Additionally, columns of resin are periodically back-flushed and regenerated as described in Example No. 1 and then substituted for exhausted resin columns within the onstream battery so as to maintain the efficiency of decaffeination.

After passage through the resin contacting zone, the extraction medium is substantially caffeine-free. The medium is recycled to the extraction battery where it removes additional caffeine from the charges of green coffee beans. Because, the medium has been selectively decaffeinated by the resins, however, it retains most of the other coffee solubles initially co-extracted from the beans. Accordingly, the medium reaches a partial equilibrium with the beans whereby only resin-removed constituents, such as caffeine, are susceptible to extraction by the solubles-containing extraction medium.

After each decaffeinated charge of green coffee beans has been removed from the extractor battery, it is dried and then processed in accordance with customary practice so as to yield a roast ground product suitable for producing an aqueous extract susceptible to use in the production of a soluble coffee product. Significantly, however, the resultant extract does not require normal treatment to remove caffeine because the roast ground coffee itself is caffeine-free. Thus, the eventual product is relatively full-bodied, as compared to prior art decaffeinated products, which at one time or another have required exposure to chlorinated hydrocarbons or other decaffeination techniques which cause degradation or loss of coffee flavor.

We claim:

1. A process for the decaffeination of aqueous extract of a vegetable material selected from the group consisting of tea and coffee comprising:
   a. contacting said extract with non-ionic, hydrophobic polymer resin having a dipole moment of less than about 2.0 debye whereby sufficient caffeine and non-caffeine solubles are adsorbed by the resin to exhaust its activity;
   b. separating the exhausted resin and decaffeinated extract;
   c. leaching said exhausted resin and adherent caffeine and non-caffeine solubles with water to selectively remove caffeine;
   d. eluting the caffeine-free resin with a wash solution comprising water and organic solvent to remove non-caffeine solubles;
   e. removing said solvent from said resin by rinsing with water; and
   f. contacting the rinsed resin with aqueous extract of vegetable material further to absorb caffeine.

2. The process of claim 1, wherein flavor and aroma volatiles are removed from the extract prior to contacting the resin and said volatiles are recombined with extract after said contacting.

3. The process of claim 1, wherein flavor and aroma volatiles are removed from the extract prior to contacting with the resin, the decaffeinated extract is dried to a solid and said volatiles are incorporated into said solid.

4. The process of claim 1, wherein the resin has a dipole moment of less than about 0.5 debye.

5. The process of claim 1, wherein the leach water of Step (c) is at a temperature of from 65° to 85° C.

6. The process of claim 5, wherein caffeine is removed from the leach water of Step (c) and then said water is recycled further to leach exhausted resin.

7. The process of claim 6, wherein caffeine is removed from leach water by reverse osmosis.

8. A process of claim 1, wherein the organic solvent of the eluate utilized in Step (d) is removed to recover an aqueous solution containing non-caffeine solubles.

9. The process of claim 8, wherein the recovered solubles are recycled to decaffeinated extract separated in Step (b).

10. A process of claim 9, wherein the organic solvent is removed from the eluate utilized in Step (d) by steam stripping, the used steam and stripped organic solvent are co-condensed to reconstitute wash solution and then said solution is recycled further to elute caffeine-free resin.

11. The process of claim 8, wherein the aqueous wash solution comprises 40 to 80% by weight of the organic solvent.

12. The process of claim 1, wherein the rinse water utilized in Step (e) and containing organic solvent is stripped with steam and then recycled further to rinse resin.

13. The process of claim 12, wherein after stripping the rinse water, the steam and organic solvent are co-condensed to reconstitute wash solution and then recycled further to elute caffeine-free resin.

14. The process of claim 1, wherein after separating exhausted resin and decaffeinated extract, but before leaching said resin, said resin is flushed with water in a direction reverse of the flow of extract to remove entrained solids.

15. The process of claim 1, wherein the organic solvent is selected from the group consisting of alcohol aldehyde and ketone solvents having a molecular weight of less than about 100.

16. The process of claim 1, wherein the resin is at least one member of the group consisting of non-ionic acrylic ester resin and non-ionic polystyrene-divinyl benzene resin.

* * * * *